US010440596B2

United States Patent
Durvasula et al.

(10) Patent No.: US 10,440,596 B2
(45) Date of Patent: Oct. 8, 2019

(54) MEASURING AND MONITORING BEAM PERFORMANCE IN MOBILE SATELLITE SYSTEM

(71) Applicant: Hughes Network Systems, LLC, Germantown, MD (US)

(72) Inventors: Bhanu Durvasula, Germantown, MD (US); Pratap Dash, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 15/708,509

(22) Filed: Sep. 19, 2017

(65) Prior Publication Data

US 2019/0090147 A1   Mar. 21, 2019

(51) Int. Cl.
| | |
|---|---|
| *H04W 24/08* | (2009.01) |
| *H04W 24/10* | (2009.01) |
| *H04W 52/18* | (2009.01) |
| *H04B 7/185* | (2006.01) |
| *H04B 17/309* | (2015.01) |
| *H04W 72/04* | (2009.01) |
| *H04B 17/00* | (2015.01) |
| *H04W 52/36* | (2009.01) |
| *H04W 88/02* | (2009.01) |
| *H04W 84/06* | (2009.01) |

(52) U.S. Cl.
CPC .......... *H04W 24/08* (2013.01); *H04B 7/1851* (2013.01); *H04B 17/0085* (2013.01); *H04B 17/309* (2015.01); *H04W 24/10* (2013.01); *H04W 52/18* (2013.01); *H04W 52/367* (2013.01); *H04W 72/046* (2013.01); *H04W 84/06* (2013.01); *H04W 88/02* (2013.01)

(58) Field of Classification Search
CPC ..... H04W 16/18; H04W 16/28; H04W 36/30; H04W 36/36; H04W 48/12; H04W 48/14; H04W 84/06; H04W 88/10
See application file for complete search history.

(56) References Cited

U.S. PATENT DOCUMENTS

| | | | |
|---|---|---|---|
| 9,276,665 B1 * | 3/2016 | Johnson | ............... H04B 7/2041 |
| 2003/0087606 A1 | 5/2003 | Dybdal et al. | |
| 2007/0207728 A1 | 9/2007 | Drakos | |
| 2008/0055151 A1 | 3/2008 | Hudson et al. | |
| 2011/0222589 A1 | 9/2011 | Howell et al. | |

(Continued)

OTHER PUBLICATIONS

US 9,595,989 B1, 03/2017, Freedman et al. (withdrawn)

(Continued)

*Primary Examiner* — Mewale A Ambaye
(74) *Attorney, Agent, or Firm* — Jones Robb, PLLC

(57) ABSTRACT

A system and method for detecting and addressing silent failures in a satellite communication system includes a satellite, one or more test terminals deployed within coverage beams of the satellite, and a central station configured to communicate with the test terminals. The test terminals are configured to establish a communication link over the satellite communication system, perform a plurality of tests, and transmit the test results to the central station. The central station: determines if system performance is below specified levels, and initiates at least one solution to improve system performance.

20 Claims, 8 Drawing Sheets

(56) References Cited

U.S. PATENT DOCUMENTS

2012/0040664 A1* 2/2012 Kamdar ................ H04W 16/18
455/425
2013/0281010 A1 10/2013 Monte et al.
2016/0165456 A1 6/2016 Durvasula et al.
2016/0380693 A1* 12/2016 Scott .................. H04B 7/18558
455/427

OTHER PUBLICATIONS

Written Opinion in PCT/US18/51702, dated Nov. 19, 2018.
International Search Report in PCT/US18/51702, dated Nov. 19, 2018.

* cited by examiner

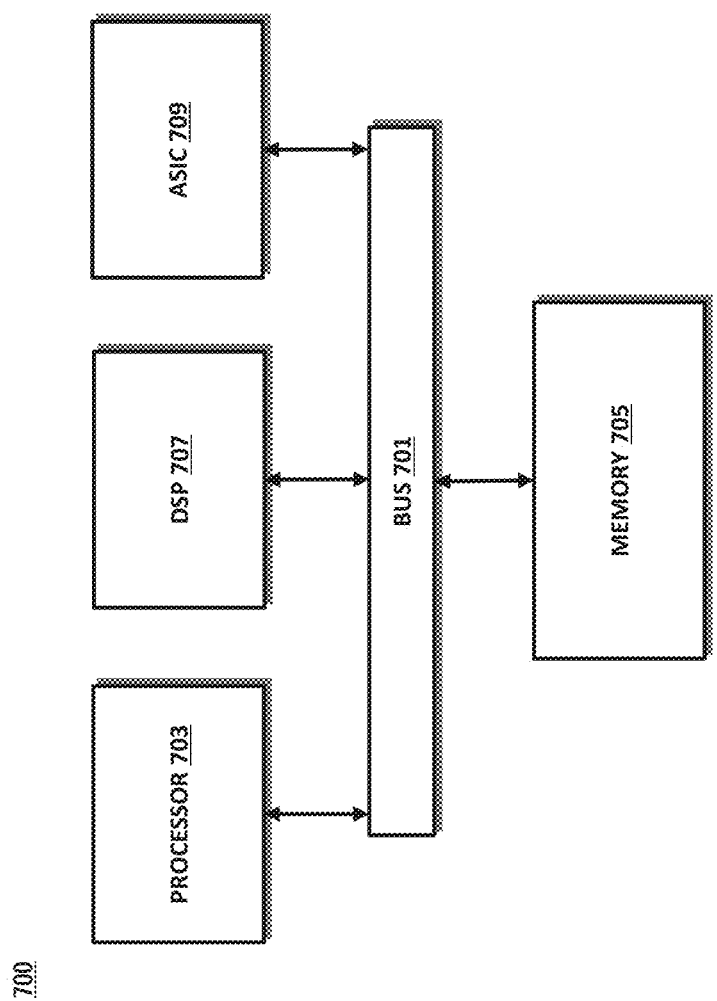

MEASURING AND MONITORING BEAM PERFORMANCE IN MOBILE SATELLITE SYSTEM

BACKGROUND INFORMATION

Recent developments in satellite communications have increased availability and reduced service costs, thereby making such technology more accessible to consumers. Satellite communication systems allow consumers to access voice and data services from virtually any global location. Such accessibility can be beneficial for consumers who are located in, or must travel to, areas that cannot be reliably serviced by normal voice and/or data communication systems.

Satellite communication systems utilize coverage beams to service specific geographical regions of a coverage area. Conventional coverage beams are often generated in the form of geometric-like shapes that are arranged to physically overlay the geographic coverage area. Thus, multiple coverage beams must often be combined in order to service the entire coverage area. Coverage beams can be defined based on various factors including, density of user terminals, available frequency, etc. User terminals within the coverage area optimize communication by selecting appropriate configuration settings (e.g., up/downlink frequencies, power, etc.) based on their assigned coverage beams.

Successful and reliable communication between user terminals and the satellite requires proper operation of various aspects of the satellite communication system. For example, the beams must be properly formed by either a Ground Based Beam Former (GBBF) that is part of the gateway or an On-Board Beam Former (OBBF), and satellite orbital data (e.g., Ephemeris data) must be processed to compensate for delay and Doppler correction. Furthermore, forward/return paths for both control and traffic channels must be properly configured so that the user terminals and gateway are capable of properly receiving and processing transmission bursts from the satellite.

Satellite communication systems can be subject to "silent" failures within individual beams if any of the operational aspects fail completely or partially. Oftentimes, such silent (or localized) failures are not detected or easily detectable, because they only affect a portion of the coverage area and not the entire system. The satellite service provider will only become aware of these silent failures after sufficient consumer complaints regarding lack of service within a particular beam coverage area. Consumers can quickly become dissatisfied because of the higher costs associated with satellite communications relative to mobile or wired communications. Based on the foregoing, it would be beneficial if failures, such as silent failures, could be quickly detected and addressed without the need to receive user complaints.

BRIEF SUMMARY

A system and method are disclosed for detecting and addressing partial failures in a satellite communication system. According to an embodiment, the system includes a satellite configured to facilitate communication within one or more coverage beams of a satellite communication system; one or more test terminals deployed within one or more of the coverage beams, wherein the terminals are ground-based; and a central station configured to communicate with the one or more test terminals. The one or more test terminals being configured to: establish a communication link over the satellite communication system using a default coverage beam during predetermined intervals, perform a plurality of tests using the established communication link, transmit results of the plurality of tests to the central station, establish a different communication link over the satellite communication system using an adjacent coverage beam during predetermined intervals, and repeat the perform a plurality of tests, the transmit results, and the establish a different communication link for each adjacent coverage beam. The central station being further configured to: determine if system performance is within specified levels, and initiate at least one solution to improve system performance, if system performance is determined to be outside the specified levels set in a testing profile by an operator.

According to another embodiment, the method includes: deploying one or more test terminals within one or more coverage beams of a satellite communication system, wherein the terminals are ground-based; establishing a communication link, by the one or more test terminals, over the satellite communication system using a default coverage beam during predetermined intervals; performing a plurality of tests using the established communication link; transmitting results of the plurality of tests to a central station; establishing a different communication link, by the one or more test terminals, over the satellite communication system using an adjacent coverage beam during the predetermined intervals; repeating the performing, the transmitting, and the establishing for each adjacent coverage beam; determining if system performance is within specified levels set in a testing profile by an operator; and initiating at least one solution to improve system performance, if system performance is determined to be outside the specified levels.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 7 is a diagram of a chip set that can be used to implement various exemplary embodiments.

DETAILED DESCRIPTION

A system and method for detecting and addressing partial failures in a satellite communication system are described.

In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
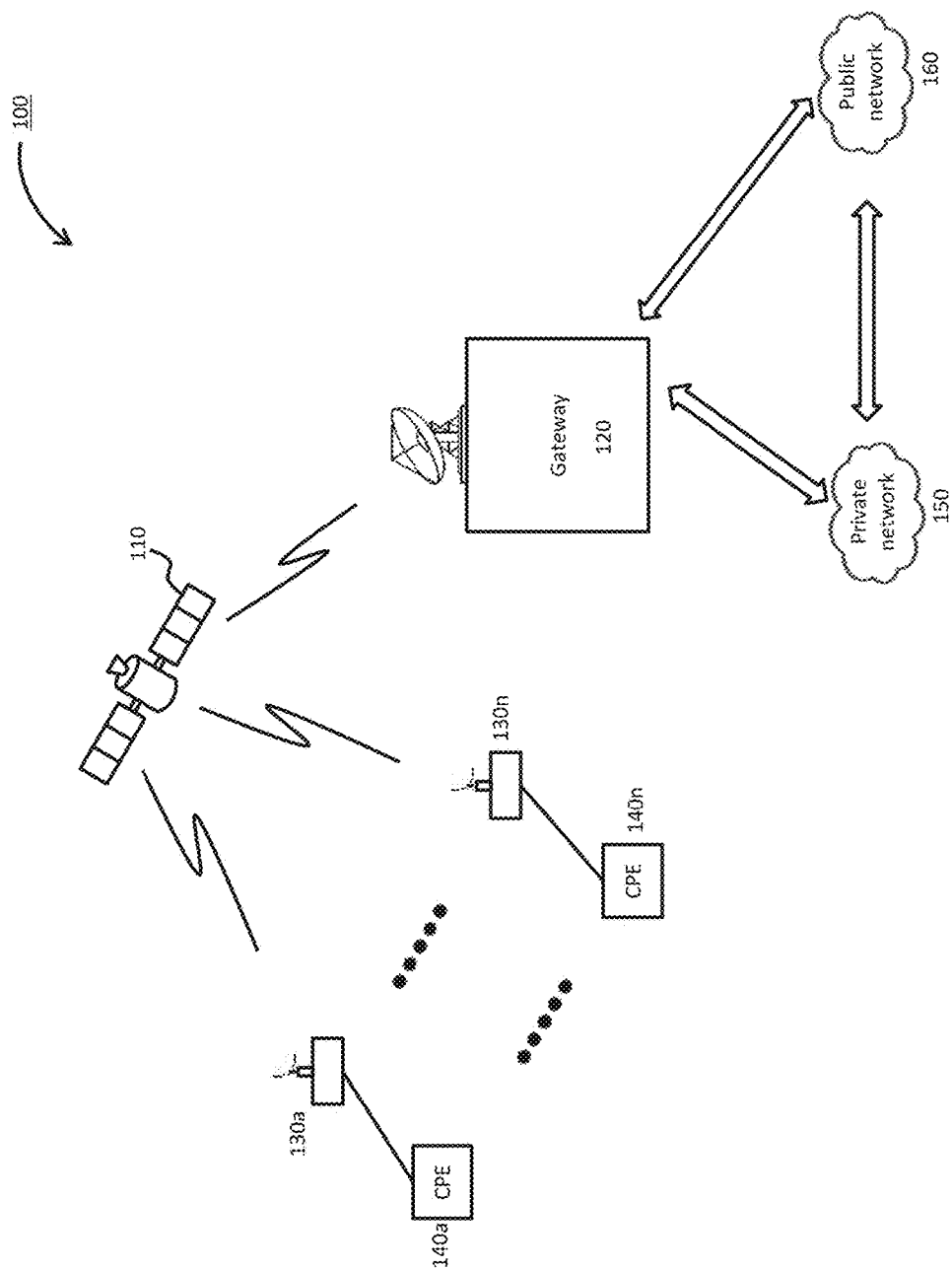
FIG. 1 illustrates a configuration for a conventional satellite communication system.

FIG. 1 illustrates an exemplary satellite communication system 100 capable of providing voice and data services. The communication system 100 includes a satellite 110 that supports communications among a number of gateways 120 (only one shown) and multiple satellite terminals (i.e., "user terminals", or simply "terminals") 130a-130n. Each satellite terminal 130 can be configured for relaying traffic between multiple customer premise equipment (CPEs) 140a-140n, a public network 160 such as the Internet, and/or from its private network 150. While not illustrated in FIG. 1, the CPEs 140 can be in the form of network enabled devices such as, for example, desktop computers, laptops, tablets, phones, etc. The gateway 120 can be configured to route this traffic across the private network 150 and public network 160 as appropriate. The gateway 120 can be further configured to route traffic from the public network 160 and private network 150 across the satellite link to the appropriate terminal 130. The terminal 130 then routes the traffic to the appropriate customer premise equipment (CPE) 140.

As illustrated in FIG. 1, the satellite communication system 100 facilitates communication between a satellite network, private networks 150, and public networks 160. Various embodiments, however, can also be configured for providing communication within only a terrestrial network (e.g., private communication networks 150 and public communication networks 160), or within only a satellite network. Thus, while FIG. 1 only illustrates components such as the terminals 130 and gateway 120, other network components such as, for example, a VPN router and a VPN gateway can be provided in place of, or in addition to, the illustrated terminal 130 and gateway 120. Furthermore, various embodiments can be incorporated within a router having QoS capabilities. Accordingly, elements shown as part of the communication system 100 illustrated in FIG. 1 are only intended to be illustrative, and in no way restrictive.

Figure 2:
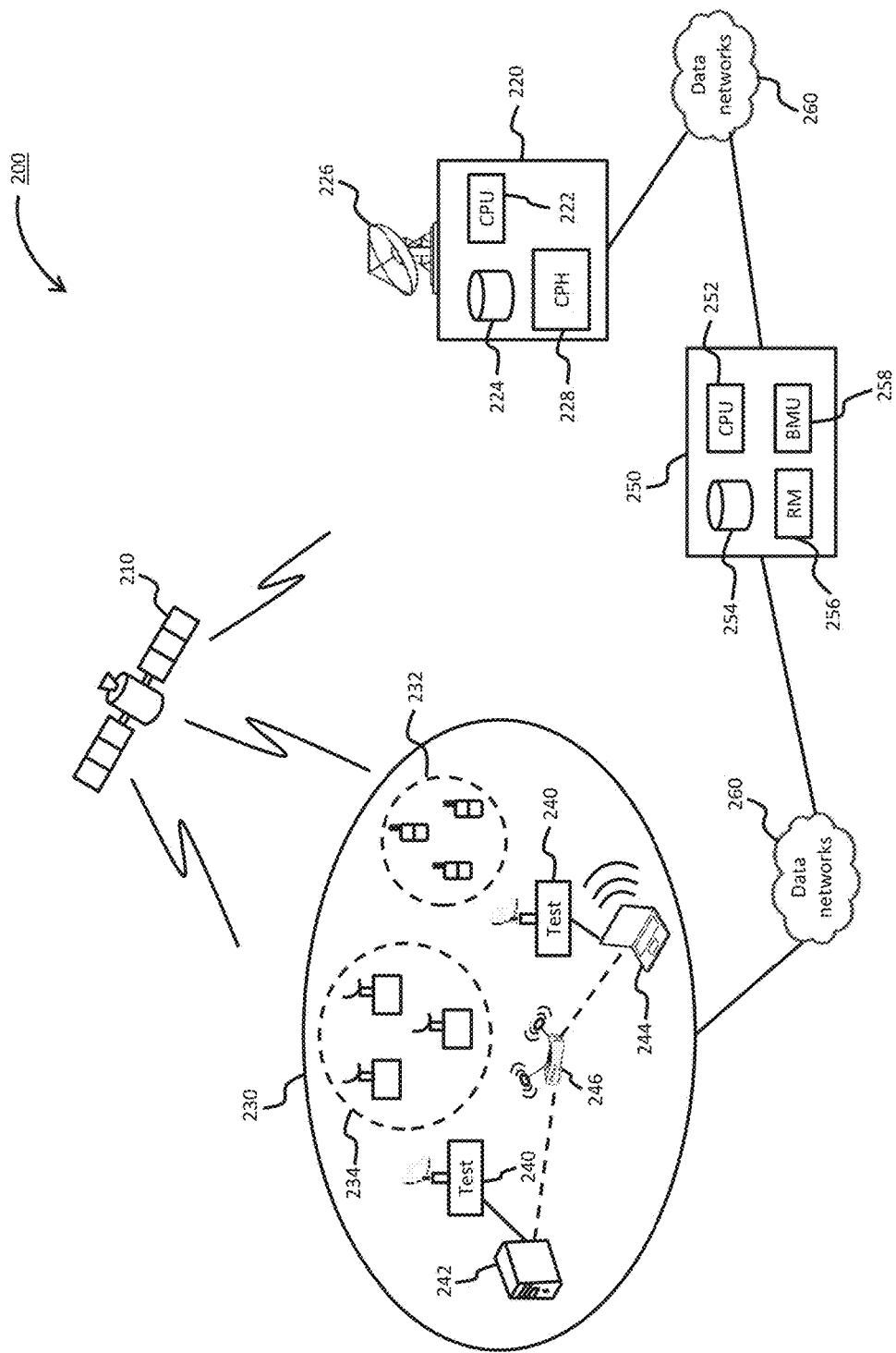
FIG. 2 is a diagram of a system capable of detecting partial communication failures, according to one or more embodiments.

FIG. 2 is a diagram of a system 200 capable of detecting partial communication failures, according to various embodiments. The system 200 includes a satellite 210, a gateway 220, and a plurality of communication components geographically residing within an exemplary coverage beam 230. According to various embodiments, the system 200 can further include a network operations center 250 and various terrestrial data networks 260. The terrestrial data networks 260 can facilitate, for example, both voice and data communication between the network operations center 250, the gateway 220, etc. According to at least one embodiment, the gateway 220 can include various hardware components necessary to facilitate ground-based communication with the communication components within the coverage beam 230. For example, the gateway 220 can include one or more processing units (or CPU) 222 that are configured (e.g., via software/program code) to control various functions and operations of the gateway 220.

While FIG. 2 illustrates a single processing unit 222, it should be noted that the processing unit 222 can be embodied within various computer systems (not shown) such as a desktop, laptop, server, etc. Furthermore, the gateway 220 can incorporate multiple processing units 222 and/or computers. The gateway 220 can further include one or more storage units 224 that can be configured to maintain and update information necessary for operation of the gateway 220. The gateway 220 further includes a radio frequency transmitter 226 for transmitting and receiving information to and from the satellite 210. According to at least one embodiment, the storage units 224 can be used to maintain configuration information for the radio frequency transmitter 226 under differing atmospheric conditions. Channel processing hardware 228 can also be included in the gateway 220. The channel processing hardware 228 (CPH) can include, for example, various equipment (hardware and/or software) used to control and process signals prior to transmission via the radio frequency transmitter 226. Depending on the particular implementation, the channel processing hardware 228 can process signals associated with individual channels or beams. According to other implementations, however, the CPU 222 can be configured to perform these functions. The gateway 220 can further exchange voice and data communication with the terrestrial data networks 260. The terrestrial data networks 260 can include at least public networks (e.g., the internet), private networks, wireless networks (e.g., cellular networks), etc.

Depending on the specific implementation, the gateway 220 can further include hardware (not shown) for physical interconnection with the terrestrial data networks 260. Such hardware can include, for example, edge routers, conventional network switches, optical network switches, etc. While FIG. 2 illustrates a single gateway 220, it should be noted that various embodiments can support multiple gateways 220 within the system 200. Additionally, the gateways 220 can be deployed in primary/secondary pairing configurations to provide redundancy in the event of equipment failure(s) at the primary gateway. Such embodiments would therefore provide a secondary gateway (not shown) in redundant configuration with the (primary) gateway 220. The secondary gateway can be located within close or distant proximity from the gateway 220. All necessary data from the gateway 220 and secondary gateway could then be synchronized using the terrestrial data networks 260.

According to the illustrated embodiment, the coverage beam 230 geographically encompasses a number of communication devices which transmit and receive information to and from the satellite 210. For example, various mobile user terminals 232 can be based within the boundaries of the coverage beam 230. The mobile user terminals 232 can be in the form of portable handsets capable of transmitting information directly to the satellite 210. A plurality of fixed user terminals 234 can also be located within the coverage beam 230. According to at least one embodiment, the fixed user terminals 234 can be in the form of very small aperture terminals (VSATs) that are capable of being mounted on various structures. For example, the fixed user terminals 234 can be mounted on homes, commercial buildings, dedicated towers, trees, etc. The fixed user terminals 234 can further connect to multiple user devices such as computers, laptops, tablets, cell phones, etc. in order to route voice and data traffic between such user devices and the satellite 200.

According to the embodiment illustrated in FIG. 2, two test terminals 240 are located within the exemplary coverage beam 230. The test terminals 240 can also be in the form of VSATs or portable handsets. Depending on the specific configuration for the test terminal 240, a computer 242 or laptop 244 can be provided for controlling various operations thereof. According to other embodiments, however, the test terminals 240 can incorporate one or more processing units that are configured to provide the desired operational controls. A wired communication link can be used to directly connect the computer 242 and/or laptop 244 to the terrestrial data networks 260. Alternatively, a router 246 having wired and/or wireless capabilities can be used to facilitate communication between the computer 242 or laptop 244 and the terrestrial data networks 260. Additionally, the laptop 244 can utilize both wired and wireless connectivity to the external data networks 260 in order to transmit information from the test terminal 240.

According to the disclosed embodiments, the test terminals 240 do not carry any user traffic. Rather, the test terminals 240 are only configured to carry test traffic while conducting various tests within the system 200 at predetermined time intervals. The test terminals 240, however, have the same communication functionality as the mobile user terminals 232 and fixed user terminals 234. Furthermore, the test terminals 240 utilize the same communication channels allocated to the coverage beam 230. Thus, the test terminals 240 operate in the same manner as the mobile user terminals 232 and the fixed user terminals 234, and are subject to the same problems that can potentially affect users (i.e., consumers).

The system 200 also includes a network operations center 250 that includes various hardware for managing different system components such as, the gateway 220, the satellite 210, the mobile user terminals 232, the fixed user terminals 234, and the test terminals 240. The network operations center 250 can include, for example, one or more processing units 252 configured to control various functions thereof. Depending on the specific implementation, however, it should be noted that the processing unit 252 can further be part of a computer, laptop, server, etc. One or more storage units 254 can also be incorporated within the network operations center 250 for storing information such as records, configuration files, etc. The network operations center 250 includes a resource manager 256 that is configured to monitor and allocate resources to various components in the system 200. For example, various embodiments provide for the resource manager 256 being configured to monitor total bandwidth in the system 200 and allocate bandwidth within each beam 230 based, at least in part, on overall usage levels, priority, service class, etc.

According to at least one embodiment, the network operations center 250 can include a beam monitoring unit 258 that is configured to remotely control operation of the test terminals 240. Alternatively, the network operations center 250 can be configured to perform some or all of these operations. The beam monitoring unit 258 can be configured, at least in part, to examine test results received from the test terminals 240 and analyze the communication channels within each beam based on the test results. The beam monitoring unit 258 can include one or more displays (not shown) for presenting information, for example, to an operator. The beam monitoring unit 258 can also be embodied within a computer system. Additionally, the CPU 252 can be configured to perform the functions of the beam monitoring unit 258. According to at least one embodiment, the operator can remotely access the test terminals 240 in order to create and/or modify testing profiles. The testing profile can be, for example, a configuration file which sets forth necessary parameters for conducting the tests. Such parameters can include types of tests to be performed (voice, data, etc.), testing interval (e.g., 1 hour, 2 hours, etc.), default beam identification, adjacent beam identification, IMSI & MSISDN for each test terminal 240, etc.

Depending on the specific implementation, the beam monitoring unit 258 can be configured to generate control signals that are supplied to the test terminals 240 via the satellite 210 and/or the terrestrial data networks 260. The control signals can initiate certain responses, such as a complete reboot or beam reassignment, of the test terminals 240. The beam monitoring unit 258 can coordinate with the gateway 220 to establish communication links with any, or all, test terminals 240 in the coverage beams 230. Furthermore, the coordination can extend to secondary gateways in embodiments that incorporate primary and secondary gateways. According to one or more embodiments, the beam monitoring unit 258 can be configured to receive or retrieve Active Resource Plan information, Beam Desired State information, and Call Detail Logs (CDL) files for interested beams from each gateway 220. Depending on the test results and system status, the beam monitoring unit 258 can also be configured to output alarms indicating loss of Frequency Correction Channel (FCCH), loss of Broadcast Control Channel (BCCH), no response to random access channel (RACH), or degradation in link quality beyond acceptable levels. An alarm can also be output to indicate failure to resolve any of the foregoing conditions after various solutions have been applied by the beam monitoring unit 258. Other embodiments, however, provide for configuring the network operations center 250 to perform all the functions of the beam monitoring unit 258.

While FIG. 2 illustrates the resource manager 256 and beam monitoring unit 258 as being co-located with the network operations unit 250, various embodiments allow for them to be located separately, or independently, of the network operations center 250. For example, a separate satellite operation manager (not shown) can be provided at a different physical location from the network operations center 250, and incorporate the resource manager 256 and/or beam monitoring unit 258 therein. Additionally, such a satellite operation manager can be configured to communicate with the network operations center 250 using the terrestrial networks 260.

According to one or more embodiments, the test terminals 240 can be configured or controlled (either local or remote) to transparently conduct various tests capable of identifying partial or complete communication failures within the system 200. The test terminals 240 can first establish a communication link with the satellite 210 based on configuration parameters for the coverage beam 230 designated as its default coverage beam. More particularly, each terminal (i.e., mobile user terminals 230, fixed user terminals 234, and test terminals 240) is assigned a default coverage beam to be used when communicating with the satellite 210. According to at least one embodiment, the communication link can be established by requesting communication bandwidth from the satellite 210 using a control channel. The test terminal 240 would then receive bandwidth allocation to be used on the traffic channels.

According to at least one embodiment, the test terminal 240 can collect various data pertaining to the control channel while establishing the communication link. The test terminal 240 can further conduct one or more tests using the traffic channel. For example, voice and data communications can be exchanged with the satellite 210 in order to obtain data pertaining to, for example, transmit power, signal loss, accurate data delivery, etc. Such tests can be conducted on both the forward path and return path of the communication channel being used by the test terminal 240. According to various embodiments, the tests can be selected to obtain and/or measure system metrics such as link quality, voice quality, transmit/receive power levels, data throughput, ping transmission/response, proper beam formation, etc. Results of the test can subsequently be transmitted to the network operations center 250 for analysis to determine whether or not the default coverage beam associated with the test terminal 240 has suffered a partial or complete failure.

According to at least one embodiment, upon completing the tests associated with its default coverage beam, the test terminal 240 can be reconfigured to utilize an adjacent coverage beam to establish a communication link with the satellite 210. The test terminal 240 would likewise conduct the same tests using the adjacent coverage beam. The test terminal 240 can also be configured to conduct different tests while using the adjacent coverage beam. Furthermore, the test terminal 240 can be configured to conduct a different set of tests for each adjacent coverage beams. The network operations center 250, or the beam monitoring unit 258, can be configured to dynamically change the tests to be conducted using the default coverage beam 230 and adjacent coverage beams based, in part, on test results received from the default coverage beam 230, adjacent coverage beams, or both.

Results of any tests conducted by the test terminal 240 can be transmitted to the network operations center 250. Depending on the specific implementation, the test terminal 240 can be reconfigured to establish new communication links with all adjacent coverage beams or a subset of all the coverage beams adjacent to the test terminal's default coverage beam. Furthermore, various embodiments allow for the test terminal 240 to store results of tests from each coverage beam locally until all coverage beams have been tested. The results of tests pertaining to the test terminal's default coverage beam as well as the adjacent coverage beams would all be transmitted to the network operations center 250 at the same time. Alternatively, the test results can be individually transmitted to the network operations center 250, as they are completed.

According to one or more embodiments, the test can be performed at predetermined times in order to provide various information pertaining to the overall availability of bandwidth, link quality, etc. while users are in the normal process of communicating using the mobile user terminals 232 and/or the fixed user terminals 234. For example, the test terminal 240 can be configured to perform the tests hourly, and provide results to the network operations center 250. Alternatively, the test terminals 240 can be configured to perform the test every 2 hours, every 3 hours, every 4 hours, etc. According to at least one embodiment, orbital data for the satellite 210 can be used as part of the criteria for to specifying the times to perform such tests. The orbital data (e.g., Ephemeris data) can correspond, at least in part, to the orbital drift of the satellite 210 while in geosynchronous orbit. Accordingly, the test results can identify discrepancies in the communication link at different times of the day based on the location of the satellite 210. Such information can be used, for example, to modify transmission parameters at different times of the day in order to optimize communication within the system 200.

As illustrated in FIG. 2, the test results can be transmitted to the network operations center 250 using the various terrestrial data networks 260. For example, the computer 242 (or laptop 244) associated with the test terminal 240 can incorporate a wired communication interface which facilitates communication over a public and/or private network such as the Internet. Similarly, the laptop 244 can incorporate both wired and wireless interfaces that facilitate communication over wired public and private networks. As previously discussed, rather than utilizing a computer 242 or laptop 244, the test terminals 240 can incorporate appropriate hardware for independently conducting the tests and transmitting results to the network operations center 250. Such hardware can include, for example, one or more CPUs, storage unit(s), network interfaces, etc. Wired or wireless interfaces can therefore be used by the test terminal 240 to directly establish a communication link over the terrestrial data network 260 and transmit the test results to the network operations center 250. The router 246 can also be used to establish wired and wireless connections with the test terminals 240, computer 242, or laptop 244. The router 246 can subsequently be used to connect with the terrestrial data networks 260. According to at least one embodiment, the test results can be transmitted to the network operations center 250 using a cellular network. According to further embodiments, test results can be transmitted via a path defined by the satellite 210, gateway 220, and subsequently the terrestrial data network 260. A completely different satellite network can be used to transmit test results to the network operations center 250.

Upon receiving the test results, the network operations center 250 performs various analysis in order to determine whether system performance is within specified levels. Depending on the specific implementation, the beam monitoring unit 258 can also be configured to perform the analysis. The network operations center 250 can be configured, at least in part, to examine test results received from the test terminals 240, and analyze the communication channels within each beam based on the test results. The network operations center 250 can also include one or more display units (not shown) for presenting information to an operator. According to at least one embodiment, the network operations center 250 can be configured to remotely access the test terminals 240 in order to create and/or modify testing profiles. The testing profile can be, for example, in the form of configuration files which set forth necessary parameters for conducting the tests. Such parameters can include types of tests to be performed (voice, data, ping, etc.), testing interval (e.g., 1 hour, 2 hours, etc.), default beam identification, adjacent beam identification, IMSI & MSISDN for each test terminal 240, etc.

The network operations center 250 can also be configured to generate control signals that are supplied to the test terminals 240 via the satellite 210 and/or the terrestrial data networks 260. The control signals can initiate responses from the test terminals 240, such as a complete reboot, beam reassignment, etc. The network operations center 250 can coordinate with the gateway 220 (and secondary gateway) to establish communication links with test terminals 240 in the coverage beams 230. The network operations center 250 can also be configured to receive or retrieve Active Resource Plan information, Beam Desired State information, and CDL files for interested beams from each gateway 220.

If the system performance is not within the specified levels, the network operations center 250 can initiate various solutions intended to improve or restore system performance to the specified levels. For example, the network operations center 250 can reallocate frequencies assigned to the traffic channels, request that the gateway momentarily discontinue and then resume transmission of signals necessary to lock on to the satellite, etc. Frequency reallocation can be performed automatically if the test results indicate that link quality degrades during certain time intervals and returns to normal during other time intervals.

According to various embodiments, if one or more test terminals 240 within a particular coverage beam 230 report a loss of signal in the downlink frequencies (e.g., indicative of a loss of BCCH), the network operations center 250 can be configured to temporarily discontinue the channel or beam transmission. This can be accomplished, for example, by sending an appropriate control signal to the gateway 220. After a predetermined amount of time, the network operations center 250 can send another control signal to the gateway 220 in order to resume the discontinued channel or beam transmission. If multiple test terminals 240 from different coverage beams 230 report a loss of signal in the downlink frequencies, the network operations center 250 can temporarily turn off (or reboot) one or more channel processing hardware 228 (CPH) specifically designated to handle the affected coverage beams by sending a control signal to the gateway 220. Once a predetermined amount of time has passed, the network operations center 250 can send another control signal to turn on the appropriate channel processing hardware 228 (CPH). As can be appreciated, any channel processing hardware 228 that receives a reboot signal would be restarted without waiting for the predetermined amount of time. If multiple test terminals 240 within a particular coverage beam 230 report poor throughput, the network operations center 250 can be configured to check the loading & congestion metrics for the coverage beam from the gateway 220. Additionally, the resource manager 256 can be configured to increase the amount of radio resources within the identified coverage beam 230.

According to still further embodiments, the network operations center 250 can be configured with predetermined rules which initiate intelligent actions designed to resolve different issues. Such rules can be based, at least in part, on previous experiences and actions that have resolved the problems. For example, if the network operations center 250 initiates one or more actions but is unsuccessful at resolving the problem, an operator can be notified. The operator can subsequently take additional steps to resolve the problem. The additional steps taken by the operator can be added to the predetermined rules so that the network operations center 250 can successfully resolve future occurrences of the same problem.

Depending on the specific test results and system status, for example, the network operations center 250 can be configured to output alarms indicating loss of FCCH/BCCH, no response to RACH, or degradation in link quality beyond the acceptable level. An alarm can also be output to indicate failure to resolve any of the foregoing conditions after various solutions have been applied by the network operations center 250. As previously discussed, such operations can also be performed by beam monitoring unit 258.

As illustrated in FIG. 2, the coverage beam 230 incorporates two test terminals 240. According to various embodiments, the two test terminals 240 can be configured such that they perform the same tests simultaneously. According to other embodiments, the tests may be performed at different time intervals. For example, one test terminal 240 may perform the tests every hour, while the other test terminal 240 performs the test every 30 minutes or every 2 hours. The results obtained by both test terminals 240 could then be transmitted to the network operations center 250 and utilized in determining the system performance on the basis of a single coverage beam 230, or a subset of all coverage beams. According to further embodiments, test results obtained from all coverage beams defined by the satellite 210 can be used in order to determine the entire system performance.

Figure 3:
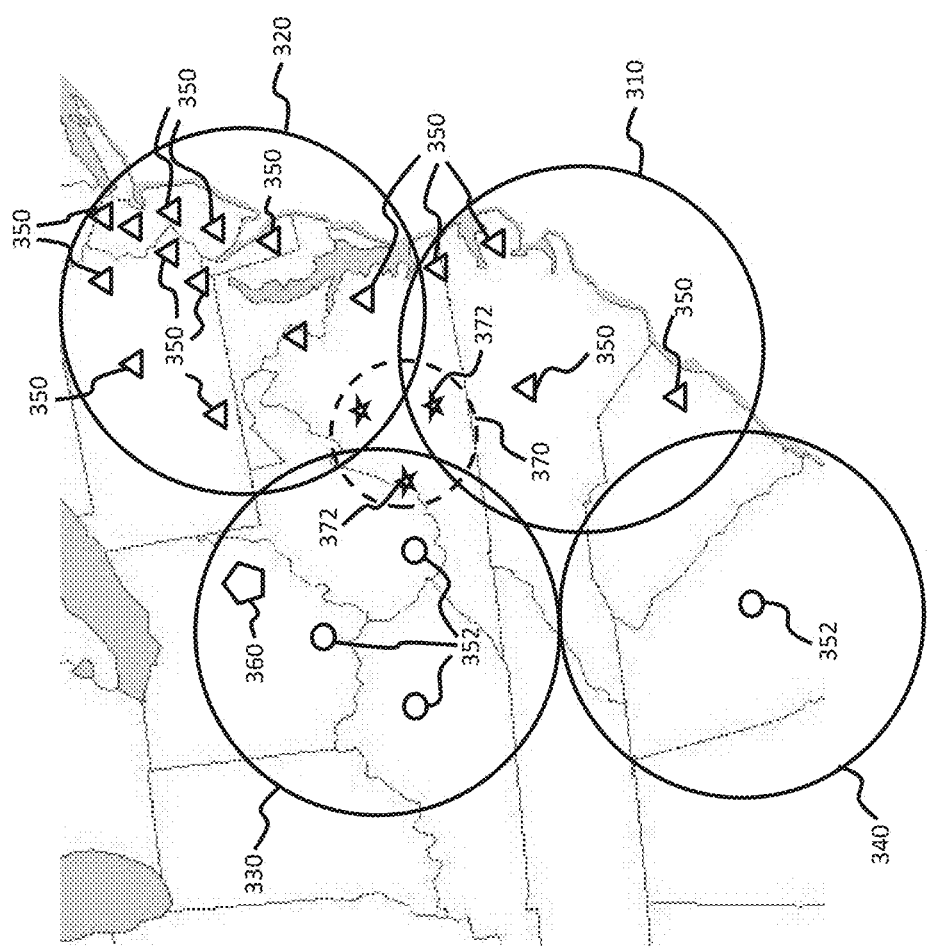
FIG. 3 is a diagram illustrating exemplary coverage beams and distribution of test terminals, according to one embodiment.

FIG. 3 illustrates the distribution of test terminals within multiple coverage beams, in accordance with one or more embodiments. Four exemplary coverage beams are shown, namely coverage beam 310, coverage beam 320, coverage beam 330, and coverage beam 340. Coverage beams 310 and 320 contain a plurality of test terminals 350 that are distributed within their defined geographical regions. According to at least one embodiment, the test terminals 350 can be distributed based on coverage density. More particularly, the test terminals 350 are distributed based on the number of user terminals that actively subscribe to service from the satellite communication system. As previously discussed, such user terminals can be either mobile user terminals or fixed user terminals. According to at least one embodiment, the coverage density criteria can be based on individual coverage beams (e.g. coverage beams 310 or 320), such that the test terminals are distributed based on the number of user terminals present in each independent coverage beam. Alternatively, the entire coverage density defined by all the beams of the satellite communication system can be considered when determining how the test terminals should be distributed. As can be seen in FIG. 3, test terminals 350 are closely distributed in the Northeast region were the population density and user terminals are higher than the Southern regions. It should be noted, however, that the coverage density shown in FIG. 3 is only meant be illustrative. Lack of wireless communication and/or high speed data options can increase the need for satellite communication systems. For example, rural areas that have limited cellular coverage or broadband communication access can often have a greater number of users subscribing to satellite communication service.

FIG. 3 further illustrates an embodiment wherein test terminals 352 are distributed based on the coverage area of coverage beam 330 and coverage beam 340. For example, each of the test terminals 352 can be positioned in such a manner that they cover a relatively equal area of the coverage beam 330. If a single test terminal 352 is used, for example, it would be positioned at the center of the coverage beam 340. Two test terminals 352 can be positioned such that they each coincide with about one half of the area of the coverage beam 330. As illustrated in FIG. 3, a gateway 360 can be located within coverage beam 330. The gateway 360 can be located within any appropriate coverage beam, based on specific system implementations. Multiple gateways 360 can also be distributed within the system. According to one or more embodiments, positioning the test terminals 350, 352 within the same coverage beam 330 as the gateway 360, or collocating the test terminals 350, 352 within the gateway 360, can advantageously reduce the amount of hardware/infrastructure which must be deployed to support the test terminals 350, 352.

According to at least one embodiment, dedicated test beams, such as test coverage beam 370 can be used for encompassing test terminals 372. The test coverage beam 370 would, therefore, only contain test terminals 372 and no active user terminals. The test coverage beam 370 can further be defined to overlap multiple adjacent coverage beams (i.e., coverage beams 310, 320, 330) such that the test terminals 372 can easily be reconfigured to communicate using any of the adjacent coverage beams. While FIG. 3 illustrates the test coverage beam 370 as being sized differently from the conventional coverage beams (310, 320, 330, 340), it should be noted that such a configuration is not intended to be restrictive. Rather, various embodiments can accommodate a test coverage beam 370 that is identically sized as the remaining coverage beams in the system.

Figure 4:
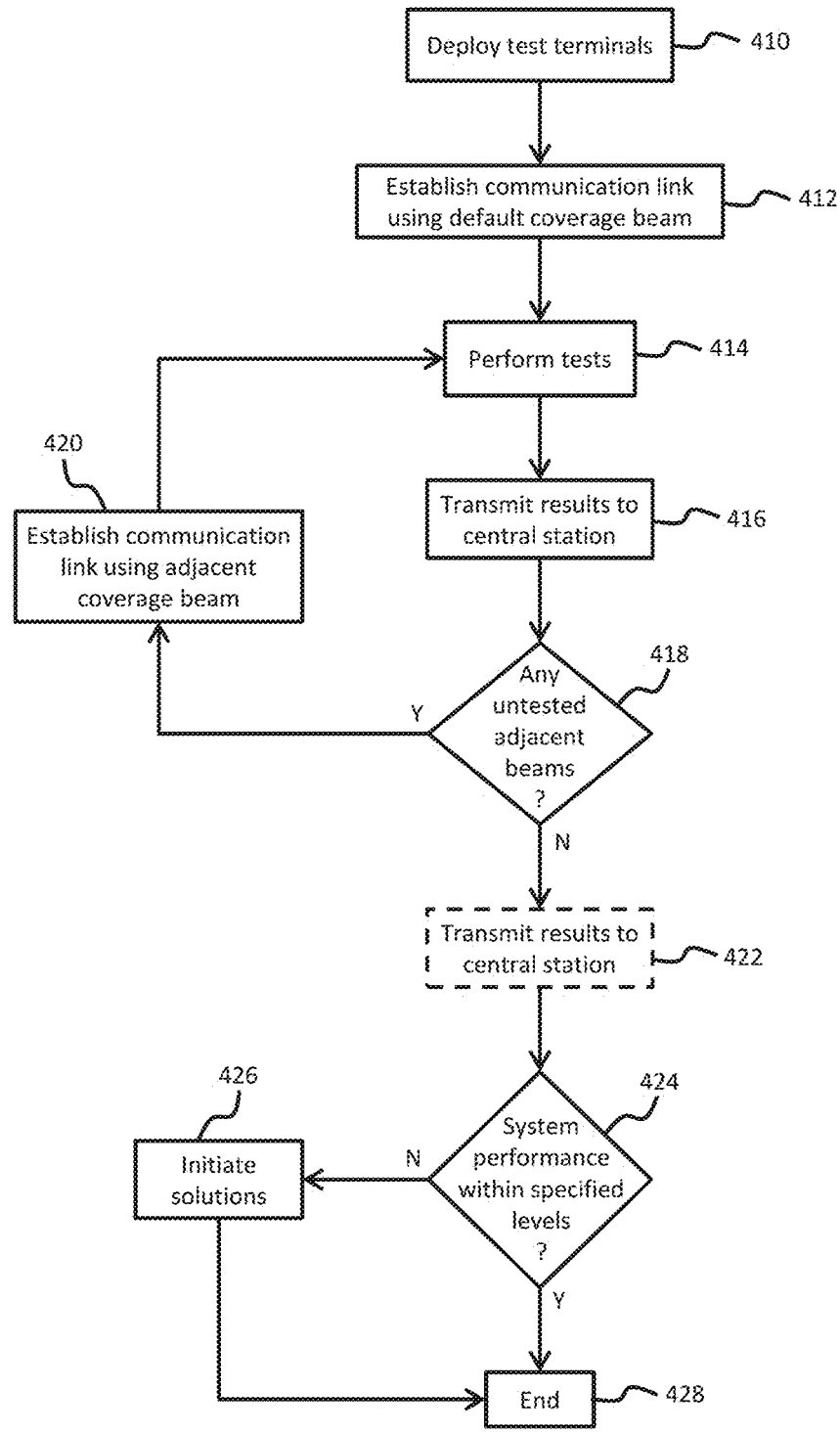
FIG. 4 is a flowchart of a process for detecting and addressing partial communication failures, according to at least one embodiment.

FIG. 4 is a flowchart illustrating the steps performed in detecting a partial communication failure, in accordance with at least one embodiment. At 410, test terminals are deployed within the system. As previously discussed, the test terminals can be deployed in accordance with various criteria. For example, the test terminals can be deployed based on the coverage density of individual coverage beams, or multiple coverage beams. The test terminals can also be deployed based on the coverage density of the entire communication system without any particular regard to individual coverage beams. Furthermore, the test terminals can be deployed simply based on the geographical area defined by individual coverage beams, multiple coverage beams, or the entire communication system. At 412, a communication link is established between the test terminal and the satellite using the default coverage beam.

Referring to FIG. 3, for example, there are four test terminals 350 located within coverage beam 310. These test terminals would, therefore, be assigned coverage beam 310 as their default coverage beam. Depending on the specific implementation: each of the test terminals can be configured to independently conduct the necessary tests, a computer associated with the test terminal can be configured to control the test terminal while conducting the tests, or the network operations center can remotely control operation of the test terminal while conducting the tests. Regardless of the particular implementation, the first test terminal would establish a communication link with the satellite.

At 414, various tests are performed by the test terminal. According to one or more embodiments, the tests are performed such that various information can be collected regarding the forward and return paths of both the control channel and the traffic channels. Thus, some of the tests may actually be performed during the process of establishing the communication link and transmitting information over the control channel to request bandwidth. The remaining tests would be performed over the traffic channel while transmitting and receiving voice and data signals. Depending on the specific implementation, a processing unit or computer can be co-located with the test terminal in order to control the details of the specific tests to be performed. According to other embodiments, however, the test terminal may establish a separate line of communication with the network operations center (e.g., using the terrestrial data networks), and the tests can be performed under the control of one or more processing units or computers within the network operations center.

At 416, the test results are transmitted to a central station, such as the network operations center. At 418, it is determined whether there are any coverage beams adjacent to the test terminal's default coverage beam that should be tested, but have not been tested yet. As previously discussed, various embodiments provide for testing one adjacent coverage beam, multiple adjacent coverage beams, or none of the adjacent coverage beams. If there are any untested coverage beams, then control passes to 420 where the test terminal establishes a communication link with the satellite using one of the adjacent coverage beams. As can be appreciated, various configuration parameters within the test terminal can be changed in order to utilize a different coverage beam.

The test terminal would then conduct the same tests using the communication link that has been established with the adjacent coverage beam at 414. Control then returns the 416 where the test results are again transmitted to the central station (or network operations center). If it is determined that there are no adjacent coverage beams to be tested (at 418), however, control would pass to 422. According to the embodiment illustrated in FIG. 3, the test terminal from coverage beam 310 would repeat the tests using three adjacent coverage beams (i.e., coverage beams 320, 330, 340). Depending on the specific embodiment, however, the test being conducted by the test terminal may not require reconfiguration for establishing a communication link using any adjacent coverage beams. Rather, all the tests can be performed using only the default coverage beam of each particular test terminal. According to still further embodiments, the test terminal may only be reconfigured to establish a communication link with the nearest adjacent coverage beam, or the 2 nearest adjacent coverage beams.

According to at least one embodiment, rather than transmitting the test results to the central station after each test (at 416), the processing unit or computer associated with the test terminal can store the results locally until all tests have been completed. The results of tests conducted using the default coverage beam and any adjacent coverage beams would all be transmitted to the central station together. This is illustrated at 422. At 424, the central station (or network operations center) analyzes the results that have been received in order to determine whether the system performance is within specified levels. As previously discussed, a separate beam monitoring unit can be included in the network operations center to control the test terminals and/or perform any necessary analysis. If the results are indicative of the system operating within prescribed parameters (i.e., normal performance levels) control passes to 428, where the process would end. Alternatively, if it is determined that system performance has degraded below a prescribed level, then control passes to 426. Various steps can be taken at the control center in order to initiate solutions that may resolve any problems within the system. For example, the control center may output new transmit and receive parameters to all user terminals within a particular coverage beam, multiple coverage beams, or all coverage beams. The control center may also reallocate frequency between coverage beams or within individual coverage beams.

Figure 5A:
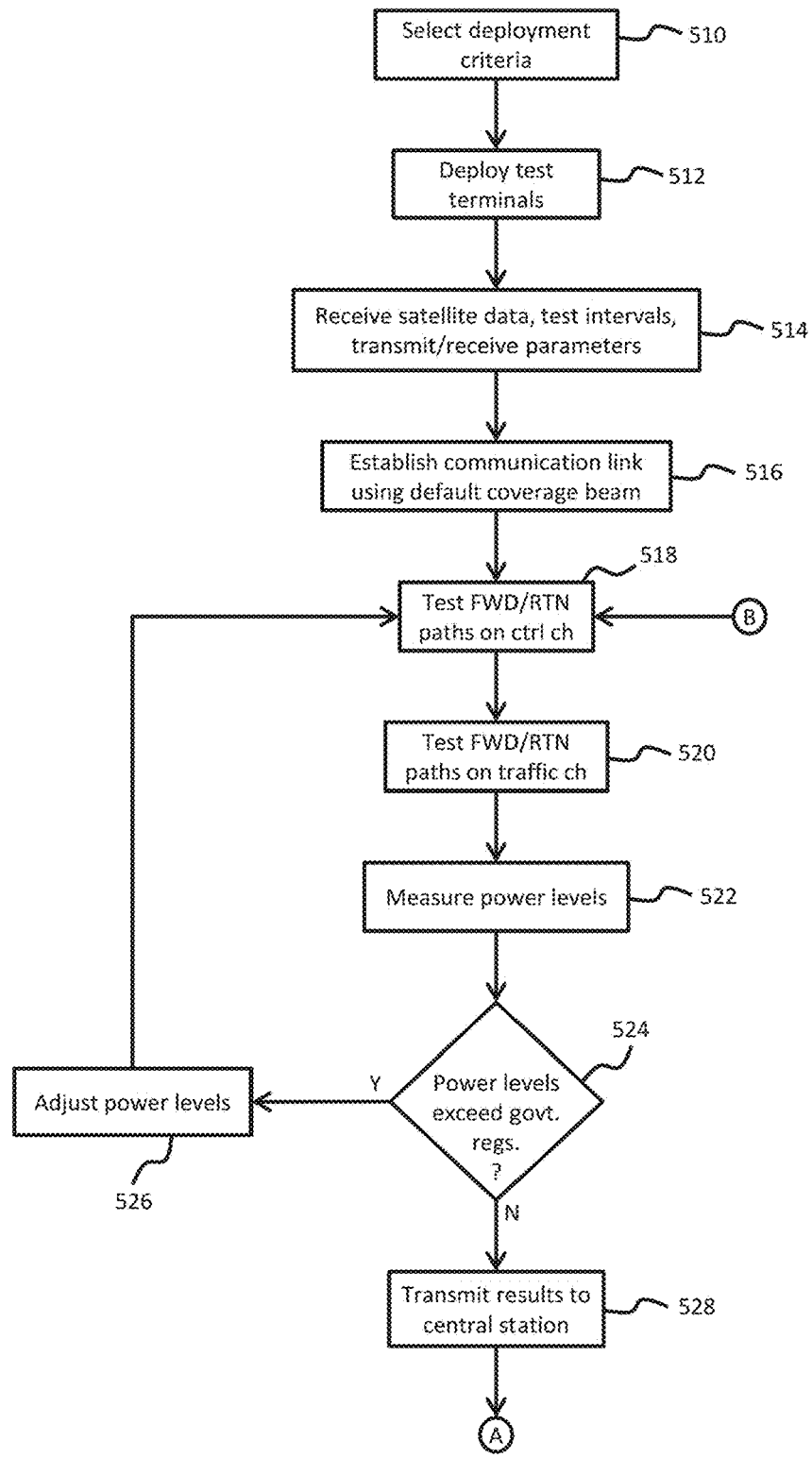
FIGS. 5A and 5B are a flowchart of a process for detecting and addressing partial communication failures, according to various embodiments.
Figure 5B:
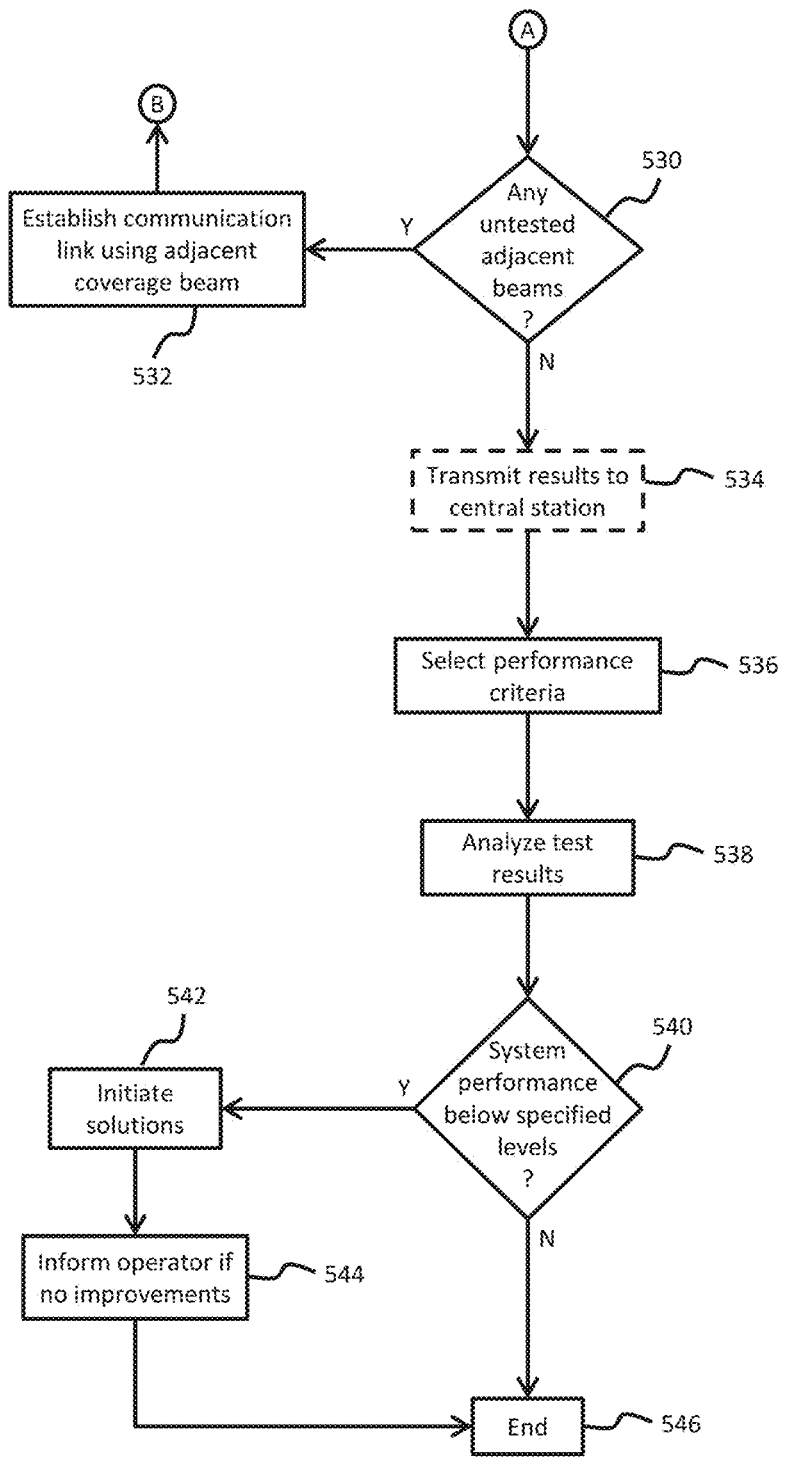

FIGS. 5A and 5B are a flowchart illustrating the steps performed in detecting partial or complete communication failures, in accordance with one or more embodiments. At 510, a deployment criteria is selected for the test terminals. The deployment criteria can be based, for example, on the density of user terminals within the coverage beam, the total density of user terminals within the entire communication system, the coverage area of each coverage beam, the total coverage area of all beams in the communication system, etc. The test terminals are subsequently deployed based on the selected criteria, at 512. At 514, various information is received. The information can include, for example, satellite data, test intervals, transmit/receive parameters, etc. According to one or more embodiments, the information can be received by the computer (or other hardware) associated with the test terminal in order to control various aspects of the tests to be performed. According to other embodiments, the test terminals can be configured to incorporate internal hardware (e.g., CPU, storage unit, etc.) to store the received information and control the entire test process. According to still further embodiments, the information can remain at the central station so that the test terminal can conduct the necessary tests under control of processing units, beam monitoring unit, or computers remotely located at the central station.

At 516, the test terminal establishes a communication link with the satellite using the default coverage beam. As previously discussed, this can be accomplished by requesting communication bandwidth from the satellite using the control channel. The test terminal would then be allocated bandwidth to be used over the traffic channels. At 518, the test terminal conducts various tests using the forward and return path on the control channel in the communication system. At 520, the test terminal conducts various tests using the forward and return path on the traffic channel. According to one or more embodiments, the tests performed on the traffic channel can be used to determine, for example, signal loss, voice quality, accurate data delivery, etc.

According to at least one embodiment, various aspects of the communication system can be subject to regulatory constraints by local government or regional agencies. For example, certain countries and/or regions may have limits regarding the output power being used when transmitting information to the satellite. The limitations can be set, for example, in order to avoid or minimize interference with adjacent satellites. According to such embodiments, the power levels of the test terminal would be measured at 522. At 524, it is determined whether the power levels exceed the limits set by any local government regulations. If the power levels exceed the specified limits, then control passes the 526 where various adjustments can be made in an attempt to reduce the power levels. For example, the symbol rate, modulation, etc. can be adjusted in order to reduce output power. If it is determined at 524 that the power levels do not exceed limits set by the government regulations, control passes to 528 where the test results are transmitted to the central station.

At 530, it is determined whether any untested adjacent coverage beams exist or remain. As previously discussed, various implementations require tests to be conducted on only the default coverage beam. Other implementations may additionally test the nearest adjacent coverage beam to the test terminal, multiple adjacent coverage beams, or all adjacent coverage beams. If there are any untested adjacent coverage beams, control passes to 532 where the test terminal is reconfigured to utilize one of the selected adjacent coverage beams. The test terminal also establishes a communication link with the satellite. Control then returns to 518, where tests are conducted using the selected adjacent coverage beam. Alternatively, if all the adjacent coverage beams have been tested or no adjacent coverage beams require testing, control passes to 534.

According to various embodiments, rather than individually sending the results of tests conducted on each coverage beam (e.g. at 528), the computer associated with the test terminal can locally store the test results until all adjacent coverage beams have been tested. At this point, all of the stored test results would be transmitted to the central station at 534. Furthermore, if the test terminal is configured to control the tests being conducted, it can store the results for each coverage beam internally. At 536, a performance criteria is selected for the communication system. The performance criteria can be based, for example, on voice quality, data transmit rate, data receive rate, maximum power output, link quality, etc. Depending on the specific implementation, one or more criteria can be selected. At 538, the test results are analyzed based, at least in part, on any of the previously selected criteria.

At 540, it is determined whether or not the system performance is below specified levels. If the system performance is below specified levels, then control passes to 542. Various solutions can be initiated in an attempt to resolve any problems associated with the system. As previously discussed, such solutions can include temporarily discontinuing the channel or beam transmission, temporarily turning off (or rebooting) one or more channel processing hardware designated to handle the affected coverage beams, checking the loading & congestion metrics for the coverage beam, increasing the amount of radio resources within the identified coverage beam, etc. The number and types of solutions applied to resolve problems can also change over time based, at least in part, on new solutions developed by an operator.

At 544, an operator at the control center can be informed if the selected solutions do not improve system performance. According to at least one embodiment, an alarm can be activated in addition to the operator notification. Alarms can be additionally provided to indicate loss of FCCH/BCCH, no response to RACH, degradation in link quality beyond the acceptable level, etc. Furthermore, if multiple solution procedures were attempted, such information can be presented to the operator in order to provide additional information regarding the state of the communication system. The process subsequently ends at 546. Alternatively, if it is determined that the system performance is not below specified levels, control passes to 546 where the process also ends.

Although the process illustrated in FIGS. 5A and 5B outline various steps performed by the test terminal, it should be noted that each test terminal within the system can be controlled to perform similar tasks within their respective default coverage beams, as well as any adjacent coverage beams. Thus, the central station would receive test results from each test terminal within the system, as well as the result of test conducted using coverage beams that are adjacent to each test terminal's default coverage beam. Thus, various embodiments can provide for analyzing the system performance based on results obtained using any combination of test terminals. For example, 1, 2, 3, . . . , or all test terminals within individual coverage beams, or the entire the system, can be used. Furthermore, each terminal can be subject to specific testing criteria such as whether or not to use any adjacent coverage beams or all adjacent coverage beams. According to still further embodiments, each terminal can be configured to conduct the tests at independent time intervals. Accordingly, the central station can conduct instantaneous analysis of the system performance, or an analysis that is based on a set time intervals (e.g., 1 hour, 2 hours, 3 hours, etc.).

Various features described herein may be implemented via software, hardware (e.g., general processor (CPU), Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described user terminals, test terminals, transmitters, transceivers, gateway, storage units, network operations center, resource manager, beam monitoring unit, etc. Additionally, such hardware can be interfaced to connect and/or facilitate communication between different collocated components such as the beam monitoring unit and the resource manager and/or storage unit. Such hardware can also be interfaced to connect and/or facilitate communication between remotely located components such as the network operations center and the gateway and/or test terminals.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 6:
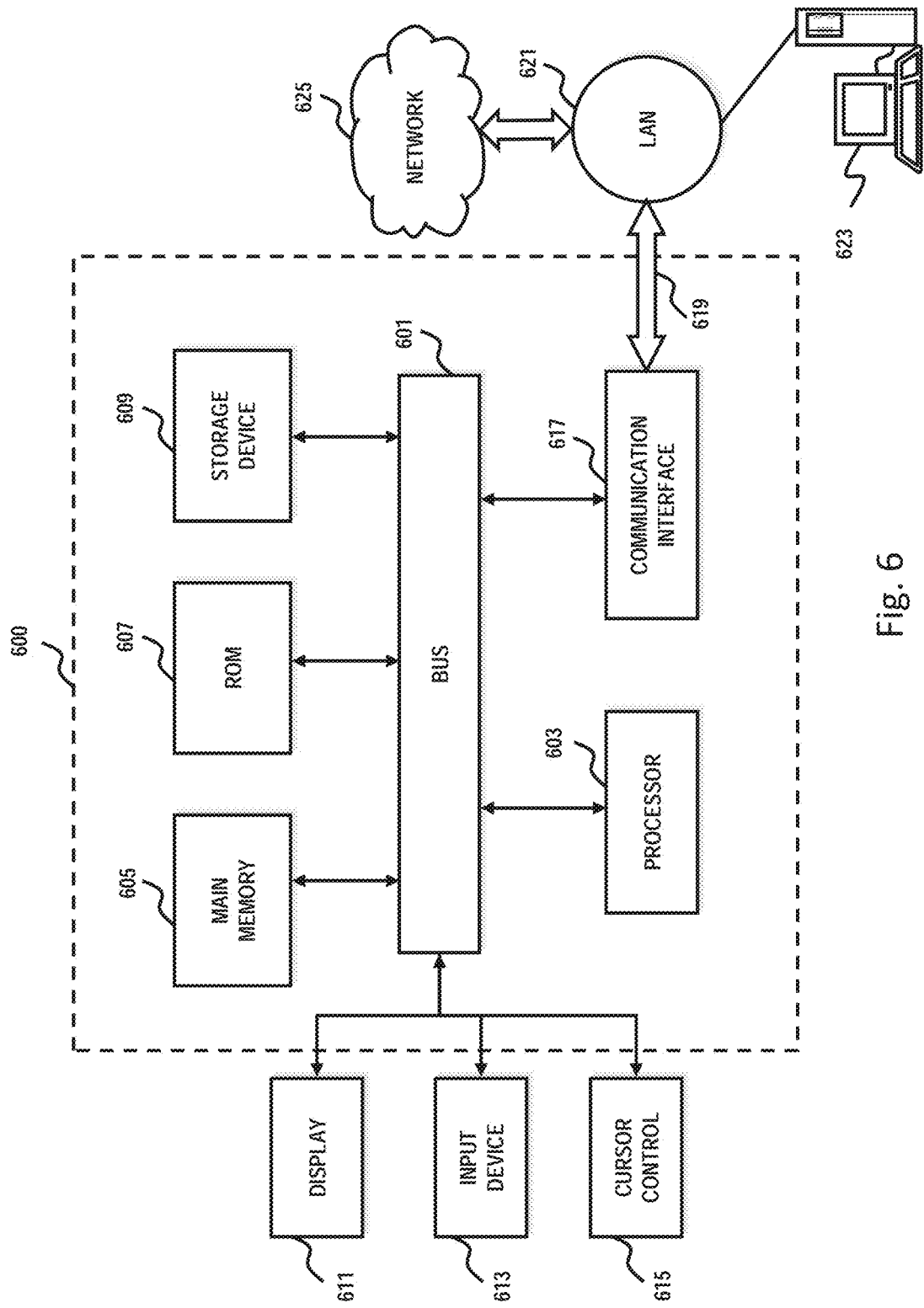
FIG. 6 is a diagram of a computer system that can be used to implement various exemplary embodiments.

FIG. 6 is a diagram of a computer system that can be used to implement various embodiments. The computer system 600 includes a bus 601 or other communication mechanism for communicating information and a processor 603 coupled to the bus 601 for processing information. The computer system 600 also includes main memory 605, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a light emitting diode (LED) or other flat panel displays, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611. Additionally, the display 611 can be touch enabled (i.e., capacitive or resistive) in order facilitate user input via touch or gestures.

According to an exemplary embodiment, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multiprocessing arrangement may also be employed to execute the instructions contained in main memory 605. In alternative embodiments, hard-wired circuitry may be used in place of or in combination with software instructions to implement exemplary embodiments. Thus, exemplary embodiments are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a High Definition Multimedia Interface (HDMI), etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 such as a wide area network (WAN) or the Internet. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an exemplary embodiment through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Non-volatile media can further include flash drives, USB drives, microSD cards, etc. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

FIG. 7 illustrates a chip set 700 upon which an embodiment of the invention may be implemented. Chip set 700 is programmed to implement various features as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of the figures.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 705 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
    deploying one or more test terminals within one or more coverage beams of a satellite communication system, wherein the test terminals are ground-based;
    establishing a communication link, by the one or more test terminals, over the satellite communication system using a default coverage beam during predetermined intervals;
    performing a plurality of tests using the established communication link;
    transmitting results of the plurality of tests to a central station;
    establishing a different communication link, by the one or more test terminals, over the satellite communication system using an adjacent coverage beam during the predetermined intervals;
    repeating the performing, the transmitting, and the establishing for each adjacent coverage beam;
    determining if system performance is within specified levels set in a testing profile by an operator: and
    initiating at least one solution to improve system performance, if system performance is determined to be outside the specified levels.

2. The method of claim 1, wherein the deploying one or more test terminals further comprises distributing the test terminals based on at least one of coverage area of each coverage beam and total coverage area of the one or more coverage beams.

3. The method of claim 1, wherein the one or more test terminals are distributed based on at least one of coverage density of each coverage beam and total coverage density of the one or more coverage beams.

4. The method of claim 1, further comprising:
    receiving orbital data for satellites in the satellite communication system,
    wherein the predetermined intervals are selected to encompass at least one full orbital drift cycle for the satellites.

5. The method of claim 1, wherein performing a plurality of tests comprises:
    testing forward and return paths of a control channel; and
    testing forward and return paths of an assigned traffic channel.

6. The method of claim 5, wherein the plurality of tests relate to at least one of: link quality, voice quality, transmit/receive power levels, data throughput, and ping transmission/response.

7. The method of claim 5, further comprising comparing values for transmit/receive parameters set by a gateway to actual transmit/receive parameter values measured by the one or more test terminals.

8. The method of claim 1, further comprising:
    adjusting power transmission parameters of the one or more test terminals to comply with local government regulations; and
    supplying the adjusted power transmission parameters to all user terminals within the respective default coverage beam of the one or more test terminals.

9. The method of claim 1, wherein transmitting results comprises transmitting results of the plurality of tests to a central station using at least one of a wired network, a wireless network, a mobile network, and a satellite network.

10. The method of claim 1, further comprising comparing results of the plurality of tests using the default coverage beam, to results of the plurality of tests using the adjacent coverage beams.

11. The method of claim 1, wherein the system performance is based on at least one of an individual coverage beam, a subset of the coverage beams, and all coverage beams in the satellite communication system.

12. A system comprising:
    a satellite configured to facilitate communication within one or more coverage beams of a satellite communication system;
    one or more test terminals deployed within one or more of the coverage beams, wherein the one or more test terminals are ground-based; and a central station configured to communicate with the one or more test terminals;

said one or more test terminals being configured to:
establish a communication link over the satellite communication system using a default coverage beam during predetermined intervals,
perform a plurality of tests using the established communication link,
transmit results of the plurality of tests to a central station,
establish a different communication link over the satellite communication system using an adjacent coverage beam during the predetermined intervals, and
repeat the perform a plurality of tests, the transmit results, and the establish a different communication link for each adjacent coverage beam; and said central station being further configured to:
determine if system performance is within specified levels, and
initiate at least one solution to improve system performance, if system performance is determined to be outside the specified levels set in a testing profile by an operator.

13. The system of claim 12, wherein the one or more test terminals are distributed based on at least one of coverage area of each coverage beam and total coverage area of the one or more coverage beams.

14. The system of claim 12, wherein the one or more test terminals are distributed based on at least one of coverage density of each coverage beam and total coverage density of the one or more coverage beams.

15. The system of claim 12, wherein:
the one or more test terminals are further configured to receive orbital data for the satellite; and
the predetermined intervals are selected to encompass at least one full orbital drift cycle for the satellite.

16. The system of claim 12, wherein the one or more test terminals are configured to perform the plurality of tests by:
testing forward and return paths of a control channel; and
testing forward and return paths of an assigned traffic channel.

17. The system of claim 16, wherein the plurality of tests relate to at least one of: link quality, voice quality, transmit/receive power levels, data throughput, and ping transmission/response.

18. The system of claim 16, wherein the one or more test terminals are further configured to compare values for transmit/receive parameters set by a gateway to actual transmit/receive parameter values measured by the one or more test terminals.

19. The system of claim 12, wherein the central station is further configured to compare results of the plurality of tests using the default coverage beam, to results of the plurality of tests using the adjacent coverage beams.

20. The system of claim 12, wherein the system performance is based on at least one of an individual coverage beam, a subset of the coverage beams, and all coverage beams of the satellite.

* * * * *